Oct. 8, 1963 H. B. OPFERKUCH 3,106,432
ADJUSTABLE JOURNAL BEARING WITH AUTOMATIC HEAT COMPENSATOR
Original Filed Oct. 28, 1960

INVENTOR.
Heinz B. Opferkuch
BY
Cyril M. Hajewski
Attorney

United States Patent Office 3,106,432
Patented Oct. 8, 1963

3,106,432
ADJUSTABLE JOURNAL BEARING WITH
AUTOMATIC HEAT COMPENSATOR
Heinz B. Opferkuch, Stuttgart-Bad Cannstatt, Germany,
assignor to Kearney & Trecker Corporation, West Allis,
Wis., a corporation of Wisconsin
Continuation of application Ser. No. 65,788, Oct. 28,
1960. This application Oct. 17, 1961, Ser. No.
146,084
11 Claims. (Cl. 308—36)

This invention relates to bearing structures and more particularly to improvements in the construction and operation in a journal bearing.

This is a continuation of my co-pending patent application, Serial No. 65,788 filed October 28, 1960, now abandoned, for an Adjustable Journal Bearing With Automatic Heat Compensator.

A general object of this invention is to provide an adjustable bearing structure having superior operating characteristics under all operating conditions.

Another object of this invention is to provide an improved bearing structure in which the running clearance in the journal bearing may be adjusted to a desired minimum.

Still another object of this invention is to provide an improved bearing structure which will not seize or freeze under a temperature increase which is caused by either high surface speeds of the bearing or a heavy load applied to the bearing.

Another object is to provide an improved adjustable bearing structure in which the necessary adjustments to correct for excessive wear will not disturb the original bearing fit.

A still further object of this invention is to provide an improved adjustable bearing having an automatic heat compensating feature.

According to this invention an improved bearing is provided having a frusto-conical axially adjustable inner sleeve supportably mounted on a rotatable shaft member. The inner sleeve is disposed to rotate in a relatively fixed outer sleeve which is provided with a tapered bore complementary to the taper of the inner sleeve. An adjusting nut is provided which is operable to effect axial adjustment between the inner sleeve and outer sleeve and thereby establish the necessary operational clearance. Automatic relative axial positioning between the inner and outer sleeves serves to effectively compensate for radial expansion occurring during operational temperature increases. For this purpose, an automatic heat compensator in the form of a bimetal washer is provided which, on the occurrence of a temperature increase, expands to assume a dish shaped configuration. This action relieves the force exerted on the inner sleeve by the adjusting nut so that there is no interference with the axial positioning adjustment of the inner sleeve relative to the outer sleeve. Upon a temperature decrease the bimetal washer operates to reestablish the initial axial position of the inner sleeve relative to the outer sleeve and thereby reestablish the requisite operational clearance.

The foregoing and other objects of the invention, which will become more fully apparent from the following detailed specification, may be achieved by the exemplifying apparatus depicted and described in connection with the accompanying drawings, in which.

Figure 1:
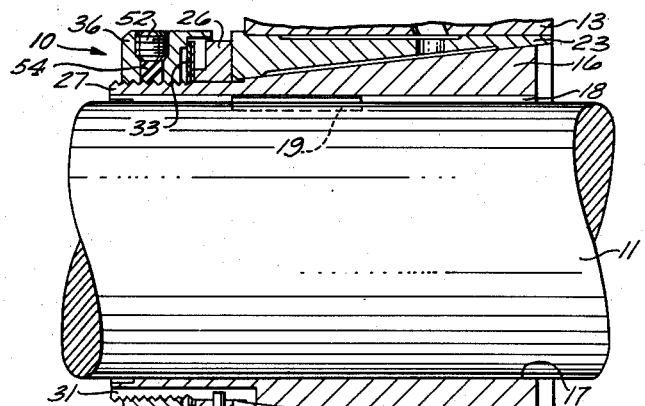
FIGURE 1 is a view in longitudinal section through a bearing support and the improved bearing in which a rotatable member is supported.

With reference to the drawings and more particularly to FIG. 1 thereof, the novel bearing of this invention, as indicated by the reference numeral 10, is shown supporting a rotatably driven member 11 operatively mounted in a suitable opening 12 provided in a supporting housing 13.

The novel bearing 10 is particularly suitable for supporting a rotatable member that is driven at a relatively high speed and which is subject to heavy radial loads, which, in turn, result in heavy loads on the bearing. For example, the rotatable member may be a cutter carrying arbor of a machine tool wherein the outboard end of the arbor extends through and is rotatably supported in an arbor support. A bearing, such as the novel bearing 10, utilized for this purpose should meet four basic requirements: (1) operational clearance in the bearing to be maintained at a minimum; (2) the design shall insure against seizure upon a temperature increase in the bearing structure resulting from extreme operating conditions; (3) uniform wear in the bearing structure must result; and (4) adjustment of the bearing due to excessive wear should not disturb the relationship of the bearing components.

Bearings heretofore used have not been altogether successful in meeting the requirements 1 and 2 enumerated above, since such bearings when adjusted to provide a desired minimum clearance at room temperature generally fail for the reason that during operation, the friction between the operating parts generates heat and a resultant expansion of the parts both linearly and radially. With the minimum operational clearance established in the bearing, expansion of the operating parts of the bearing will result in freezing and failure. As a result, it has been the practice to operate the machine until the bearing parts reach a preselected temperature and only then the bearing would be adjusted for a desired clearance. However, under these conditions an increase in the surface speed of the bearing or an increase of the load applied to the bearing results in further expansion of the parts and ultimate failure of the bearing. Conversely, a decrease of the surface speed of the bearing, and/or in the load applied to the bearing, will bring about a temperature decrease and contraction of the parts to create excessive clearance between the bearing members. The bearing is then inadequate to rotatably support a precision member, with the requisite degree of rigidity.

The novel bearing of the present invention provides a solution for these problems in that the bearing is designed to automatically adjust and compensate for expansion and contraction of the operating parts of the bearing upon the occurrence of temperature variations therein. Those parts of the bearing subject to wear are so arranged and constructed that wear occurs uniformly and in a manner that the basic configuration thereof remains unchanged. Adjustment of the bearing is readily accomplished to correct for excessive wear and such adjustment does not distort the bearing components.

As shown in FIG. 1, the novel bearing structure includes an inner sleeve 16 having a cylindrical bore 17 adapted to receive the shaft or rotatably driven member 11 with a sliding fit therebetween. A longitudinally extending keyway 18 is provided in the bore 17 to receive a key 19 which, in turn, is disposed to fit in a suitable key receiving slot formed in the rotatable member 11. The key 19 operates to couple the inner sleeve 16 and shaft 11 together during rotational movement and simultaneously permit the sleeve to slide axially on the shaft 11. This construction permits the inner sleeve to be axially adjusted for establishing an operational clearance and to compensate for distortion resulting from temperature changes during continuous operation.

The inner sleeve 16 is of frusto-conical configuration presenting a tapered external bearing portion 21 which is adapted to be received in a tapered bore 22 formed in an outer sleeve 23 press fitted into the opening 12 of the supporting housing 13. A radial outwardly extending flange 24 integrally formed on the left or outer end of the outer sleeve 23 abuts against the outer face of the supporting housing 13. Thus, rightward movement of the outer sleeve in the supporting housing 13 is effectively prevented. Rotation occurs between the tapered bearing surfaces of the inner and outer bearing members or sleeves. A radial load on the bearing will produce a resultant axial force due to the taper. This axial force tends to create axial movement between the bearing members which is counteracted by an annular collar or thrust member 26 disposed on an extending end portion 27 integrally formed on the end of sleeve 16.

Member 26 is disposed to engage the left end face of the sleeve 23, as viewed in FIG. 1, and is mounted to rotate with the sleeve 16 by means of a pin 28; the laterally mounted pin extends into a longitudinal keyway 31 provided on the end portion 27 of the sleeve 16. With this arrangement, the member 26 rotates with the sleeve 16 while remaining axially movable for adjustment and operational purposes. The member 26 is formed with an axially extending hub portion 32 which engages an annular bimetal washer 33. An adjusting nut 36 threadedly retained on sleeve 16 is machined with a circular recess 37 and a stepped counterbore 38 to provide an annular shield 39 of length sufficient to encircle the member 26. As shown, the diameter of the counterbore 38 is greater than the diameter of the annular member 26 in order to provide clearance therebetween.

A suitable lubricating oil must be used between the tapered surface 22 of sleeve 23 and the mating tapered surface of the sleeve 16. Such lubricant is supplied from a source (not shown) to a passage 43 formed in the support 13. The passage is in communication with a longitudinally extending oil reservoir groove 44 formed on the outer periphery of sleeve 23. Oil from the oil reservoir groove 44 flows through a passage 46 in the sleeve 23 into a longitudinal supply groove 47 formed in the surface of the tapered bore 22. Thus, as the inner sleeve 16 rotates, the external tapered surface thereof will be continuously lubricated.

As previously indicated, adjusting nut 36 is threadedly mounted on the threaded end portion 27 of the sleeve 16 and presents an internal annular seat 51 to engage the one face of the bimetal washer 33 immediately adjacent the outer periphery thereof. By adjusting the nut 36 rightwardly, the annular seat 51 of the nut 36 will engage the face of the bimetal washer and effect movement thereof rightwardly until the other face of the washer engages the face of the hub 32 of the collar member 26. Thus, adjustment of the nut 36 serves to apply an axial rightwardly acting pressure via the bimetal washer to the member 26. Since the outer sleeve 23 is prevented from moving rightwardly by the radial flange 24, a reaction force in the opposite direction is developed which is transmitted back through the bimetal washer to the adjusting nut and thereby causes the sleeve 16 to move leftwardly, relative to the outer sleeve 23. In this manner, a desired operational clearance between the tapered bearing surface of the sleeve 16 and the tapered bore of the outer sleeve 23 may be effected and maintained. As wear occurs between the cooperating parts of the bearing structure and too much clearance between the inner sleeve 16 and outer sleeve 23 results, this excessive clearance may be readily removed by effecting a further adjustmnet of the nut 36. Such adjustment does not distort any of the parts of the structure and no induced stresses are developed to weaken the bearing or cause a premature failure thereof.

The nut 36 is maintained in an adjusted position by means of a set screw 52 which is disposed in the threaded end of a radial opening formed in the nut 36. The set screw 52 abuts a plug 54 and moves it endwise into engagement with the threads on the end of the portion 27 of the sleeve 16 and serves to effectively lock the nut 36 in adjusted positive.

In operation, high surface speeds or heavy loads applied to the bearing will result in an increase in the heat generated due to friction. Increased heat will cause the various parts to expand, which, in most instances, will result in bearing freezing and failure; this is especially true if the clearance between the bearing surfaces is relatively small. To overcome this undesirable characteristic, the bimetal washer 33 operates to compensate for thermal expansion or contraction of the parts. The bimetal washer 33 is comprised of two different metals having different coefficients of thermal expansion and is disc shaped. The bimetal washer is positioned to present the side having the lower coefficient of thermal expansion against the thrust member 26, while that side having the greater coefficient of thermal expansion is disposed to engage the annular seat 51 on the side of nut 36. As the load on the bearing increases during operation, heat generated due to the resulting frictional increase will raise the temperature of the entire bearing assembly. The temperature increase will occur uniformly throughout the assembly and result in expansion of the inner sleeve 16, the outer sleeve 23, thrust member 26, bimetal washer 33, and other parts thereof.

Figure 2:
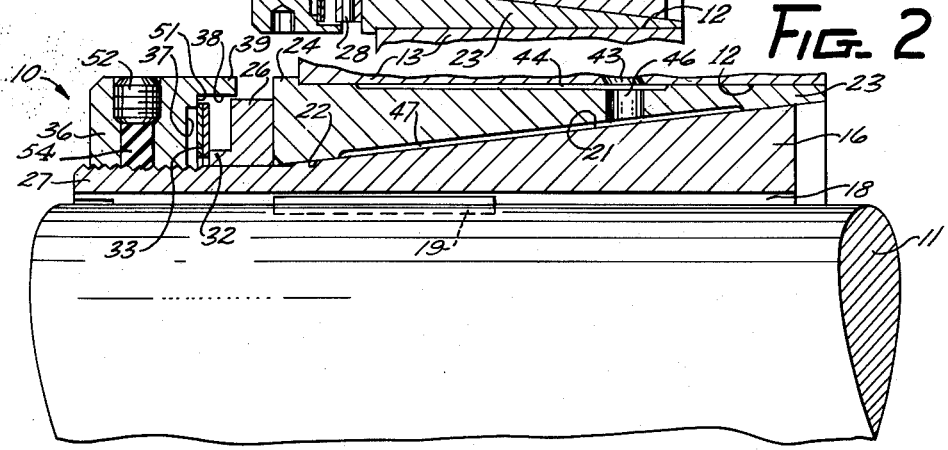
FIG. 2 is an enlarged fragmentary view showing in detail the arrangement of the bimetal washer in relation to the thrust bearing and adjusting nut under one operational condition.
Figure 3:
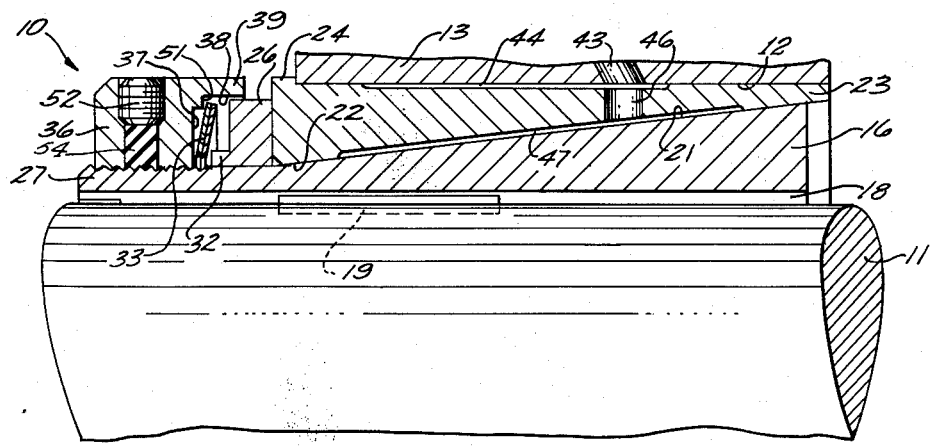
FIG. 3 is an enlarged fragmentary view of the parts depicted in FIG. 2 showing the relationship of the same parts after temperature changes have occurred.

In FIG. 2, the bearing structure is shown illustrating various components as disposed at an atmospheric temperature. In FIG. 3, the bearing structure is shown illustrating the relative position of the various components at an elevated temperature sufficient to cause the components to expand. At atmospheric temperature, the bimetal washer 33 is flat, as indicated in FIG. 2, whereat it serves to maintain the selected operational clearance between the inner sleeve 16 and the outer sleeve 23. With an increase in the temperature, the outer sleeve cannot expand radially outwardly since it is confined in the support 13 and is prevented from expanding rightwardly since flange 24 thereon abuts against support 14; therefore, sleeve 23 is limited to expansion leftwardly, as viewed in FIGS. 2 and 3. The abutting member 26 will likewise expand correspondingly leftwardly. As expansion occurs, outer sleeve 23 will tend to enlarge radially inwardly while inner sleeve 16 will simultaneously expand radially outwardly. Since the two opposing forces are applied to the complementary tapered surfaces of the outer and inner sleeves, axial expansion of the inner sleeve will occur in a resultant rightward direction. This rightward expansion of the inner sleeve 16 effects a change in its axial position relative to the outer sleeve 23 and thereby increases bearing clearance therebetween.

Simultaneously with this occurrence, the heat is transmitted to the bimetal washer 33 and effects distortion thereof. The heat is contained by the annular skirt or shield portion 39 of the adjusting nut 36. Since the washer metal adjacent to the thrust member 26 has a coefficient of thermal expansion which is less than the metal on the opposite side, the washer 33 will dish towards the thrust member, as best shown in FIG. 3. Such operation of the bimetal washer 33 prevents the impartation of force to either the adjusting nut 36 or the thrust member and no interference with the relative axial expansion of the two sleeves results. Thus, the change in the axial position of the inner sleeve 16 relative to the outer sleeve 23 is not restricted and will provide adequate clearance between the two sleeve components as expansion continues.

When the bearing surface speed and/or the load applied on the bearing is decreased, the generated heat will likewise decrease. At this time, both the inner sleeve 16 and outer sleeve 23 will contract both axially and radially to a normal size existing at room temperature. However, the contraction that takes place in these components will not necessarily insure that the original adjusted relative axial position between the inner sleeve and outer sleeve will be reestablished. However, at this time, the bimetal washer 33 will automatically revert to its normal flat configuration, as shown in FIG. 2. As the bimetal washer 33 returns to its normal flat condition, it will bear against the hub 32 of the thrust member 26 and against the annular seat 51 in the adjusting nut 36 and effect a leftwardly acting force on the nut. This leftwardly acting force will cause the inner sleeve 16 to move axially in a leftward direction relative to the outer sleeve 23. As a result, the inner sleeve 16 will be returned to its original adjusted position relative to the outer sleeve 23 and reestablish the operating clearance originally established by the preselected adjustment of the nut 36.

From the foregoing detailed description of an adjustable journal bearing, it is apparent that there has been provided an adjustable bearing with automatic heat compensator which is selectively adjustable for establishing a desired clearance in a bearing disposed between a rotating member and the fixed member. The adjustable bearing presents the advantage of automatically compensating for expansion in the component parts due to an increase in the heat generated by reason of high surface speeds within the bearing or an increase in the load applied to the bearing.

Furthermore, the adjustable bearing of the present invention includes means which operates automatically upon a temperature decrease to insure the return of the bearing components to their original adjusted relationship.

The principles of this invention having now been fully explained in connection with the foregoing description, I hereby claim as my invention:

1. In a bearing for movably supporting a member; a first bearing element having a tapered surface; a second bearing element having a tapered surface complementary to the tapered surface of said first bearing element and in bearing engagement therewith so that said bearing elements may be moved relative to each other in the direction of the tapers for adjusting the bearing pressure upon the tapered surfaces of said bearing elements; and adjusting means operable in response to temperature variations for effecting relative axial movement of said bearing elements in the direction of their tapers to compensate for expansion and contraction due to temperature variations and thereby maintain the desired bearing pressure upon said tapered surfaces.

2. In a bearing for rotatably supporting a member; an inner sleeve keyed to the member for rotation therewith and presenting a tapered exterior surface; a rotationally fixed outer sleeve embracing said inner sleeve and having an interior tapered surface complementary to the tapered surface of said inner sleeve and in bearing engagement therewith; and means operable in response to temperature variations to axially shift said sleeves relative to each other to accommodate the expansion and contraction that occurs due to the temperature variations for maintaining a substantially uniform bearing pressure upon said tapered surfaces.

3. In a bearing for rotatably supporting a member; an inner sleeve mounted to rotate with the member and having a frusto-conical surface; an outer sleeve having a frusto-conical surface in bearing engagement with the frusto-conical surface of said inner sleeve so that the bearing pressure upon said frusto-conical surfaces may be adjusted by axial movement of said sleeves relative to each other; and a bimetal washer operably mounted to retain said sleeves in the desired relative positions during normal temperature, said bimetal washer being arranged to distort in response to elevated temperatures to release said sleeves for relative axial movement and thereby relieve the excess bearing pressure upon said frusto-conical surfaces.

4. In an adjustable bearing; an outer sleeve; an inner sleeve, said outer and inner sleeves having mating tapered bearing engagement; an adjusting nut threadedly connected to said inner sleeve in position to apply an axial force to said outer sleeve for effecting an adjustment in the axial position of said inner sleeve relative to said outer sleeve for establishing a desired operational clearance therebetween; a bimetal washer interposed between said adjusting nut and said outer sleeve and operable in a normal condition to take the adjusting force of said adjusting nut and transmit the force to said outer sleeve, said bimetal washer operating upon an increase in the operating temperature of the bearing to relieve the force applied to said outer sleeve by said adjusting nut so that said inner sleeve may expand in an axial direction to adjust its axial position relative to said outer sleeve for maintaining operational clearance between the bearing surfaces to compensate for the radial expansion which occurs in said sleeves, and upon a decrease in the operating temperature in the bearing said bimetal washer will contract and return to its normal condition and in doing so being operable to effect an adjustment in the axial position of said inner sleeve relative to said outer sleeve to reestablish the operational clearance between the bearing surfaces of said sleeves as originally established through the operation of said adjusting nut; whereby a desired operational clearance may be established between the bearing surfaces of said sleeves for a selected normal operating temperature condition by selectively adjusting said adjusting nut and upon an increase in the temperature the bearing automatically compensates for the radial and axial expansion occurring in the bearing components to maintain clearance between the bearing surfaces, and also, to adjust the axial position of said inner sleeve relative to said outer sleeve for reestablishing the desired operational clearance when the temperature decreases.

5. In a bearing adapted to be mounted in a fixed support for supporting a rotatably driven member; an outer sleeve adapted to be mounted in the support and constrained against rotation relative to the support, said outer sleeve having one end formed with an outwardly extending radial flange arranged to engage the support to prevent axial movement of said outer sleeve in one direction relative to the support, said outer sleeve having a tapered bore constructed with the large diameter at the end of the outer sleeve opposite the flanged end thereof; an inner sleeve of frusto-conical configuration the taper of which is complementary to the taper of the bore provided in said outer sleeve, said inner sleeve having an axial opening adapted to receive the rotatably driven member; means connecting said inner sleeve to the rotatably driven member for rotation therewith but permitting axial movement of said inner sleeve relative to the member; a cylindrical mounting end integrally formed with said inner sleeve and extending axially from the small diameter end of said inner sleeve, said mounting end having a threaded section; a thrust washer slidably mounted on said mounting end and disposed in engagement with the flanged end of said outer sleeve, said thrust washer having an axial hub which extends in the direction away from said outer sleeve; means operably connecting said thrust washer to said inner sleeve so that it rotates with said inner sleeve but permits of relative axial movement between said thrust washer and said inner sleeve; a bimetal washer losely mounted on said cylindrical mounting end of said inner sleeve and disposed in engagement with said axial extending hub of said thrust washer; an adjusting nut threadedly engaged on the threaded portion of said cylindrical mounting end, said adjusting nut having a circular recess of stepped diameter forming an annular seat against which the outer circular edge of said bimetal washer engages, the larger diameter of the stepped recess being sufficiently large to provide clearance between its surface and the peripheral edge of said bimetal washer, the depth of the recess to the annular seat being such that the peripheral skirt formed in providing the stepped recess will encircle said thrust washer when said adjusting nut is threaded on the threaded mounting end of said inner sleeve; whereby axial positioning of said inner sleeve relative to said outer sleeve may be effected by operation of said adjusting nut to effect closer cooperation between the tapered surface of said inner sleeve with the surface of the tapered bore of said outer sleeve for establishing a desired running clearance, and when the heat generated during operation of said bearing increases expansion in said outer sleeve and said inner sleeve takes place in a controlled axial direction by reason of the tapered mating engagement of the two components so that adjustment in the axial position of said inner sleeve relative to said outer sleeve occurs to compensate for the radial expansion of the two components and the bimetal washer also expands to relieve the forces on said outer sleeve and said inner sleeve that is exerted thereon by said adjusting nut so that the axial expansion of the inner sleeve in the controlled directions is unrestricted, said bimetal washer operating upon a decrease in the generated heat to resume its normal configuration to reestablish the force factors of said adjusting nut to insure a return of said inner sleeve and said outer sleeve to their original axial positions relative to each other.

6. In an adjustable bearing for a rotatably driven member; a fixed member having an opening; an outer sleeve having a tapered bore disposed in the opening in said fixed member in a manner to be held against rotation; an outwardly extending radial flange integrally formed on the end of said outer sleeve where the tapered bore has the least diameter, said flange being adapted to engage said support when said outer sleeve is disposed in the opening thereof to prevent axial movement of said outer sleeve relative to said support in one direction; an inner sleeve of frusto-conical configuration presenting an external tapered bearing surface adapted to be received within the tapered bore provided in said outer sleeve, said inner sleeve having an axial opening through which the rotatably driven member extends; means connecting said inner sleeve to the rotatably driven member in a manner that said inner sleeve will rotate with the latter but is free to move axially relative to it; an adjusting nut threadedly connected to said inner sleeve and operable to exert an axial force on said inner sleeve for effecting an axial positioning adjustment of said inner sleeve relative to said outer sleeve for establishing the clearance therebetween; a bimetal washer mounter about said inner sleeve and interposed between said adjusting nut and said outer sleeve and operable in its normal condition to transmit the adjusting force therebetween, said bimetal washer expanding upon a temperature increase and operating to release the forces between said outer sleeve and said inner sleve developed from said adjusting nut to permit said inner sleeve to expand and to adjust its axial position relatve to said outer sleeve so that a running clearance between the outer sleeve and inner sleeve is maintained, said bimetal washer contracting upon a decrease in temperature and thereupon operating to apply the opposite acting forces to said outer sleeve and said inner sleeve to thereby reestablish the axial position of said inner sleeve relative to said outer sleeve as originally established by said adjusting nut; whereby a desired running clearance may be estalished between said inner sleeve and said outer sleeve and upon an increase in the temperature said outer sleeve and inner sleeve expand axially in opposite directions and said bimetal washer also expands to permit said outer sleeve and inner sleeve to adjust their axial positions relative to each other to compensate for the radial expansion also occurring in the latter members and upon a decrease in the temperature said bimetal washer contracts to its original state to reestablish the axial position of said inner sleeve relative to said outer sleeve as originally effected through said adjusting nut.

7. In an adjustable bearing for a rotatably driven member; a fixed member having an opening therethrough; an outer sleeve having a tapered bore disposed in the opening provided in said fixed member and held against rotation and axial movement in one direction relative to said fixed member; an inner sleeve having a bearing portion of frusto-conical configuration the taper of which is complementary to the taper of the bore of said outer sleeve and disposed in said sleeve; an adjusting nut threadedly engaged on said inner sleeve and operable when adjusted to develop opposite acting forces on said outer sleeve and said inner sleeve, the force applied to said outer sleeve by said adjusting nut being in the direction in which said outer sleeve is held against axial movement, and the force that is applied to said inner sleeve being in the opposite direction to move the tapered bearing surface of said inner sleeve into close cooperation within the tapered bore of said outer sleeve to thereby establish a desired running clearance between said inner sleeve and said outer sleeve; a bimetal washer mounted about said inner sleeve and interposed between said adjusting nut and said outer sleeve in position to transmit the opposite acting forces between said outer sleeve and said inner sleeve as applied by said adjusting nut when in its normal condition, said bimetal washer expanding upon a temperature increase and operating to release the opposite acting forces to thereby permit said inner sleeve to expand axially which expansion in one direction is restricted by reason of the tapered mating engagement effected between said outer sleeve and said inner sleeve so that the axial expansion occurring in said inner sleeve is directed in the opposite direction and said inner sleeve adjusts its axial position relative to said outer sleeve to provide clearance therebetween to compensate for the radial expansion which also occurs; whereby running clearance may be established between said inner sleeve and said outer sleeve by operation of said adjusting nut and upon a temperature increase adjustment in the axial positions of said inner sleeve relative to said outer sleeve will occur in a controlled direction to compensate for the radial expansion which also occurs so that adequate clearance between the bearing member is maintained, and when the temperature decreases said bimetal washer contracts to its normal condition reestablishing the opposite acting forces to effect an adjustment in the axial position of said inner sleeve relative to said outer sleeve so that the original adjustment is once again established.

8. In an adjustable bearing for a rotatable member; a fixed support having an opening through which the member extends; an outer sleeve having a radial flange formed on one end thereof and provided with a tapered bore disposed in the opening provided in said fixed support with the flange of said outer sleeve in engagement with said fixed support, the tapered bore in said outer sleeve being constructed so that the largest diameter of the bore is at the end of said outer sleeve opposite the flange thereon; an inner sleeve having a frusto-conical bearing portion presenting an external tapered surface adapted to be received within the tapered bore of said outer sleeve, said inner sleeve having an axial cylindrical bore adapted to slidably receive the rotatable member; means connecting said inner sleeve to the rotatable member in a manner that said inner sleeve will rotate with the rotatable member but is free to move axially relative to it; a thrust washer having an axial extending hub mounted on said inner sleeve in engagement with the end face of the flange of said outer sleeve and arranged so that the hub thereof extends outwardly; an adjusting nut having an axial recess and a counterbore forming an annular seat threadedly engaged on said inner sleeve; a bimetal washer mounted about said inner sleeve in position to engage the end of the hub of said thrust washer, said bimetal washer having its outer annular edge engaging against the annular seat formed in said adjusting nut so that adjustment of said nut will forcefully engage the outer annular edge of said bimetal washer which will operate to transmit the force applied to the hub of said thrust washer to move said thrust washer into forceful engagement with the face of the flange of said outer sleeve which is prevented from moving axially by reason of the engagement of the flange with the outer face of said support to thereby effect axial movement of said inner sleeve on the rotating member and to adjust the axial position of said inner sleeve relative to said outer sleeve for establishing a desired running clearance therebetween, said bimetal washer being operable to expand upon a temperature increase and in expanding the outer edge thereof inclines inwardly towards the support to relieve the forces that are applied to said outer sleeve and said inner sleeve so that said inner sleeve will also expand axially in a controlled direction to adjust its axial position relative to said outer sleeve to compensate for the radial expansion which also occurs to provide adequate clearance between said outer sleeve and said inner sleeve, and upon a decrease in the temperature said bimetal washer contracts to its normal condition to reestablish the opposite acting forces on said outer sleeve and said inner sleeve and thereby effect axial positioning of said inner sleeve relative to said outer sleeve so that the running clearance as effected through the original adjustment of said adjusting nut will be reestablished; whereby said bearing may be adjusted to establish a desired running clearance for normal operation and said bearing will automatically adjust itself to maintain an adequate running clearance upon an increase in the generated heat due to friction under heavy operating conditions and will also adjust itself to reestablish the preset running clearance when the generated heat decreases.

9. In an adjustable bearing for a rotatable member; a fixed support having an opening therein; an outer sleeve having an outwardly extending flange integrally formed on one end thereof and provided with a tapered bore with the large diameter of the bore being at the end of said outer sleeve opposite the end on which the flange is formed, said outer sleeve being disposed in the opening provided in said support in a manner to be held against rotation relative to said support; an inner sleeve having a bearing portion of frusto-conical configuration presenting an external tapered bearing surface adapted to be received within the tapered bore of said outer sleeve and having a cylindrical axial bore adapted to slidably receive the rotatable member; means connecting said inner sleeve to the rotatable member in a manner so that said inner sleeve will rotate with the member but is free to move axially relative to the member; adjusting means operably connected to said inner sleeve for effecting an adjustment in the axial position of said inner sleeve relative to said outer sleeve for establishing a desired running clearance therebetween; an element carried by said inner sleeve and responsive to a temperature increase to render said adjusting means inoperative so that said inner sleeve may expand axially in a controlled direction to adjust its axial position relative to said outer sleeve to compensate for radial expansion of said outer sleeve and said inner sleeve occurring upon a temperature increase to thereby maintain adequate running clearance between said outer sleeve and said inner sleeve, said temperature responsive element operating upon a temperature decrease to adjust the axial position of said inner sleeve relative to said outer sleeve for reestablishing the running clearance therebetween as originally effected by said adjusting means; whereby said adjusting means may be operated to establish a desired running clearance between said outer sleeve and said inner sleeve for normal operation of the bearing and said bearing automatically compensates for radial expansion in said outer sleeve and said inner sleeve due to an increase in the generated heat by controlling the direction of axial expansion of said inner sleeve so that it adjusts its axial position relative to said outer sleeve and the axial position of said inner sleeve relative to said outer sleeve will be automatically readjusted when the generated heat decreases to reestablish the running clearance for normal operating conditions.

10. In a bearing for supporting a rotatable member; a fixed support having an opening therein through which the rotatable member extends; an outer sleeve having a tapered bore disposed in the opening in said support in a manner to be maintained axially immovable in one direction and nonrotatable relative to said fixed support; an inner sleeve having a bearing portion of frusto-conical configuration presenting an external tapered surface adapted to be received in the tapered bore of said outer sleeve, said inner sleeve having an axial extending cylindrical threaded portion which extends outwardly beyond the end of said outer sleeve which has the smaller diameter of the bore therein, said inner sleeve having an axial cylindrical bore adapted to slidably receive the rotatable member; means connecting said inner sleeve to the rotatable member in a manner that said inner sleeve will rotate with the rotatable member but is axially movable relative to it; a thrust washer mounted on the axial exending cylindrical threaded portion of said inner sleeve and connected thereto in a manner so as to rotate with said inner sleeve but is axially movable relative to it, said thrust washer being disposed so as to engage the axial end of said outer sleeve and being provided with an axial hub which extends outwardly in a direction away from said outer sleeve; a bimetal washer mounted about said axial extending cylindrical threaded portion of said inner sleeve and disposed in engagement with the end face of the hub formed on said thrust washer, the arrangement being such that the contact between said bimetal washer and said thrust washer is effected at the inner annular face of one side of said bimetal washer with the hub of said thrust washer; an adjusting nut having a threaded axial opening therethrough and threadedly engaged on the threaded axial extending cylindrical portion of said inner sleeve, said adjusting nut having a recess coaxial with the threaded opening and a counterbore which forms an annular seat in said adjusting nut, the diameter of the counterbore being greater than the outer diameter of said bimetal washer so that a separation between the peripheral surface of said bimetal washer and the surface of the counterbore is maintained at all times, the depth of the recess being such as to provide a clearance at all times between the bottom surface of the recess and inner annular surface of the bimetal washer face adjacent thereto, the counterbore also being of a depth sufficient to form an annular skirt which encircles said thrust washer when said adjusting nut is positioned so that the annular seat formed therein engages the outer annular face of the bimetal washer; whereby axial positioning of said inner sleeve relative to said outer sleeve may be effected to establish a desired running clearance therebetween by adjusting said nut to apply a force to the outer annular surface of one face of said bimetal washer which operates to transmit the force to the hub of said thrust washer and thereby to said outer sleeve which is maintained axially immovable in the direction of the applied force and by reason of the threaded connection between said adjusting nut and said inner sleeve said inner sleeve will be caused to move axially in the opposite direction to effect an adjustment in its axial position relative to said outer sleeve and establish a desired running clearance therebetween for normal operation, said bimetal washer operating upon a temperature increase to expand so that its outer annular edge dishes inwardly towards said outer sleeve without restriction and thereby relieves the adjusting force on said outer sleeve and said inner sleeve so that axial expansion of said inner sleeve in a controlled direction will occur also without restriction, the direction of expansion being controlled by the tapered mating relationship of said outer sleeve and said inner sleeve so that said inner sleeve will automatically adjust its axial position relative to said outer sleeve to compensate for the radial expansion which also occurs so that adequate running clearance between said outer sleeve and said inner sleeve is maintained, and said bimetal washer operates upon a temperature decrease to contract to its normal condition thereby reestablishing the adjusting forces as originally applied to said outer sleeve and said inner sleeve by said adjusting nut so that said inner sleeve will be moved axially in the direction opposite to the direction in which it expanded axially to readjust its axial position relative to said outer sleeve to reestablish the running clearance for normal operation of the bearing.

11. In an adjustable bearing for supporting a rotatable member relative to a fixed support having an opening through which the rotatable member extends; an outer sleeve having an outwardly extending flange integrally formed on one end thereof and provided with a tapered bore formed with its large diameter at the end of said outer sleeve opposite the end on which the flange is formed, said outer sleeve being disposed in the opening in the fixed support through which the rotatable member extends in a manner to be nonrotatable therein; an inner sleeve having a bearing portion of frusto-conical configuration presenting an external tapered surface adapted to be received within the tapered bore of said outer sleeve and having a cylindrical axial opening for slidably receiving the rotatable member; means connecting said inner sleeve to the rotatable member in a manner so that said inner sleeve rotates with the rotatable member but is free to move axially relative to it; means operable to supply a lubricant to the external tapered surface of said sleeve so that as said inner sleeve rotates the lubricant supplied to its surface will be carried thereby to form a lubricating film between the surface of the tapered bore of said outer sleeve and the external tapered surface of said inner sleeve; adjusting means connected to said inner sleeve and operable to effect an adjustment in the axial position of said inner sleeve relative to said outer sleeve for establishing a desired running clearance therebetween, said adjusting means also being operable to maintain said inner sleeve in its axial adjusted position; and a heat responsive element operable upon an increase in the generated heat occurring during operation of the bearing to render said adjusting nut inoperable to maintain said inner sleeve in its axial adjusted position so that the increased generated heat will cause expansion of said inner sleeve in a controlled direction by reason of the complementary tapered mating engagement effected between said outer sleeve and said inner sleeve, and said inner sleeve in expanding in a controlled direction will adjust its axial position relative to said outer sleeve to maintain adequate running clearance between said sleeve members to compensate for the radial expansion which also occurs, said heat responsive element operating upon a decrease in the generated heat to effect a readjustment in the axial position of said inner sleeve relative to said outer sleeve to reestablish the running clearance between said outer sleeve and said inner sleeve as originally established through the operation of said adjusting means; whereby said adjusting means may be actuated to establish a desired running clearance between said inner sleeve and said outer sleeve for normal operation and upon an increase in the generated heat occurring during operation of the bearing said inner sleeve will automatically adjust its axial position relative to said outer sleeve to maintain adequate running clearance therebetween to compensate for the radial expansion which occurs in said inner sleeve and said outer sleeve and upon a decrease in the generated heat said heat responsive element operates to effect an adjustment in the axial position of said inner sleeve relative to said outer sleeve in a direction to reestablish the original running clearance therebetween.

References Cited in the file of this patent

UNITED STATES PATENTS

| | | |
|---|---|---|
| 1,433,424 | Stoner | Oct. 24, 1922 |
| 2,047,186 | Bates | July 14, 1936 |
| 2,180,136 | Bates | Nov. 14, 1939 |
| 2,727,796 | Sardou | Dec. 20, 1955 |